United States Patent
Dietle et al.

(10) Patent No.: US 6,334,619 B1
(45) Date of Patent: Jan. 1, 2002

(54) HYDRODYNAMIC PACKING ASSEMBLY

(75) Inventors: Lannie Dietle; Manmohan S. Kalsi, both of Sugar Land, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 09/314,349

(22) Filed: May 19, 1999

Related U.S. Application Data

(60) Provisional application No. 60/086,129, filed on May 20, 1998, and provisional application No. 60/113,840, filed on Dec. 24, 1998.

(51) Int. Cl.⁷ ............................................... F16J 15/32
(52) U.S. Cl. ....................................... 277/559; 277/551
(58) Field of Search ............................... 277/549, 551, 277/558, 559, 560, 572, 576, 577, 586, 587

(56) References Cited

U.S. PATENT DOCUMENTS

| | | |
|---|---|---|
| 2,442,687 A | 6/1948 | Heathcott |
| 2,706,655 A | 4/1955 | Showalter |
| 3,271,039 A | 9/1966 | Kohl et al. |
| 3,913,460 A * | 10/1975 | Wright |
| 3,929,340 A * | 12/1975 | Peisket |
| 4,387,902 A * | 6/1983 | Conover |
| 4,484,753 A | 11/1984 | Kalsi |
| 4,610,319 A | 9/1986 | Kalsi |
| 5,195,754 A | 3/1993 | Dietle |
| 5,230,520 A | 7/1993 | Dietle et al. |
| 5,263,404 A * | 11/1993 | Gaucher et al. |
| 5,678,829 A | 10/1997 | Kalsi et al. |
| 5,738,358 A | 4/1998 | Kalsi et al. |
| 5,823,541 A | 10/1998 | Dietle et al. |
| 5,873,576 A | 2/1999 | Dietle et al. |
| 6,007,105 A * | 12/1999 | Dietle et al. |
| 6,036,192 A | 3/2000 | Dietle |
| 6,109,618 A * | 8/2000 | Dietle |
| 6,120,036 A | 9/2000 | Kalsi |

FOREIGN PATENT DOCUMENTS

WO    WO 95/03504    2/1995

* cited by examiner

*Primary Examiner*—Anthony Knight
*Assistant Examiner*—Vishal Patel
(74) *Attorney, Agent, or Firm*—James L. Jackson; Mayor Day Caldwell & Keeton, LLP

(57) ABSTRACT

A hydrodynamically lubricated rotary seal or packing assembly which provides environmental exclusion, lubricant retention and hydrodynamic interfacial lubrication in applications where the environment pressure may be higher than the lubricant pressure. The invention is particularly suitable for oilfield drilling swivels and rotary mining equipment, and for applications such as artificial lift pump stuffing box assemblies and centrifugal pumps where a rotating shaft penetrates a pressurized reservoir which is filled with abrasive-laden liquids, mixtures or slurries. The invention provides a unique sealing mechanism which controls high pressure abrasive fluids, and which accomplishes hydrodynamic lubricant pumping activity to maintain efficient lubrication at the dynamic sealing interfaces thereof to thus significantly enhance service life. The invention provides a non-circular support surface which efficiently supports the non-circular flank of a hydrodynamic rotary sealing element against environmental pressure, thereby maintaining the integrity of the non-circular lubricant edge and the abrupt circular environment edge of the sealing element.

33 Claims, 5 Drawing Sheets

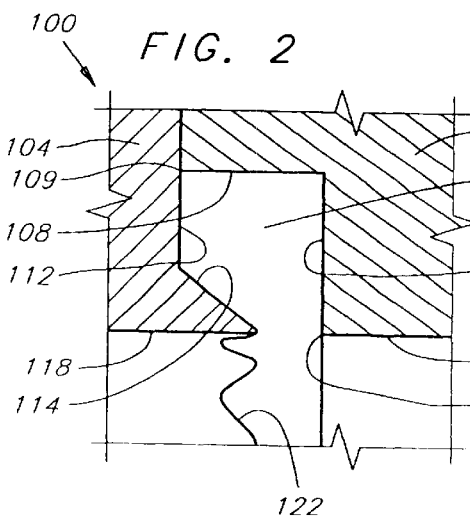
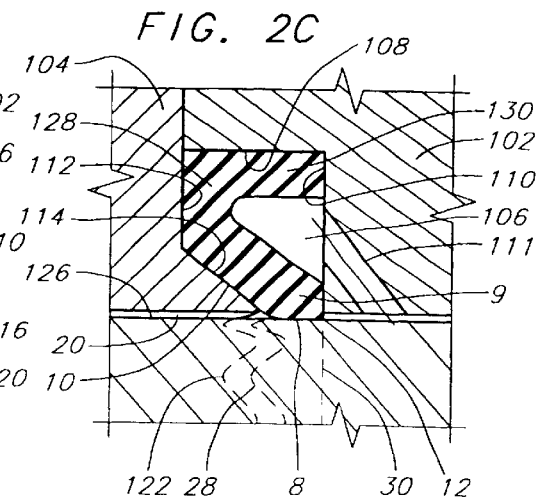
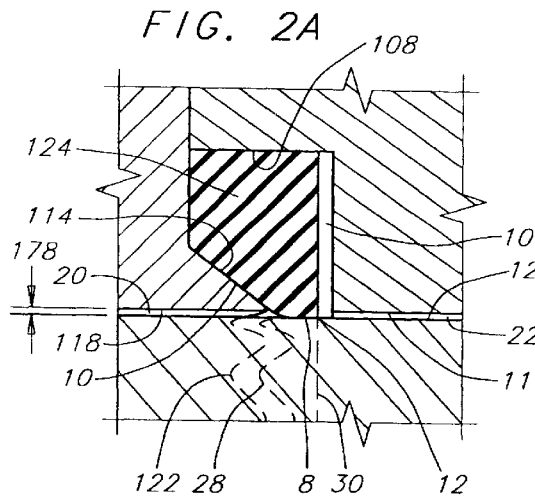
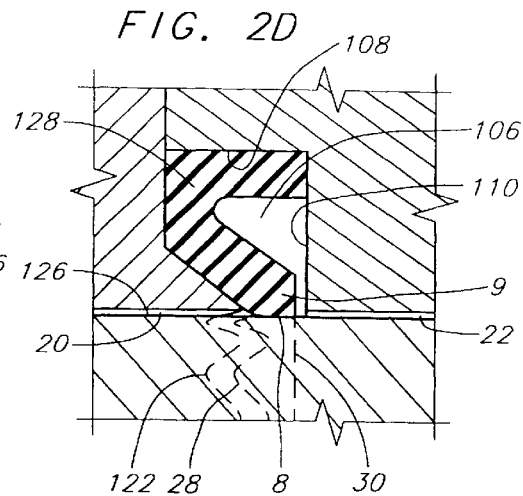
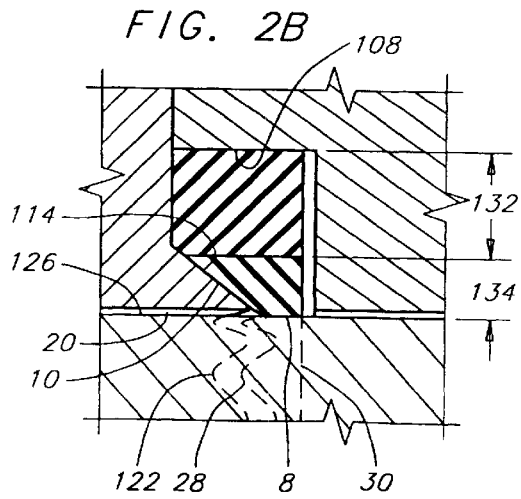
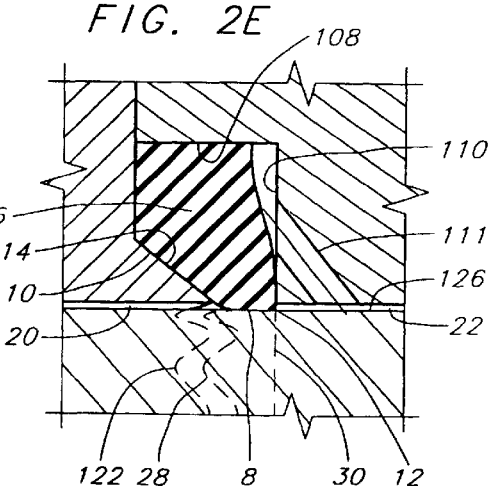

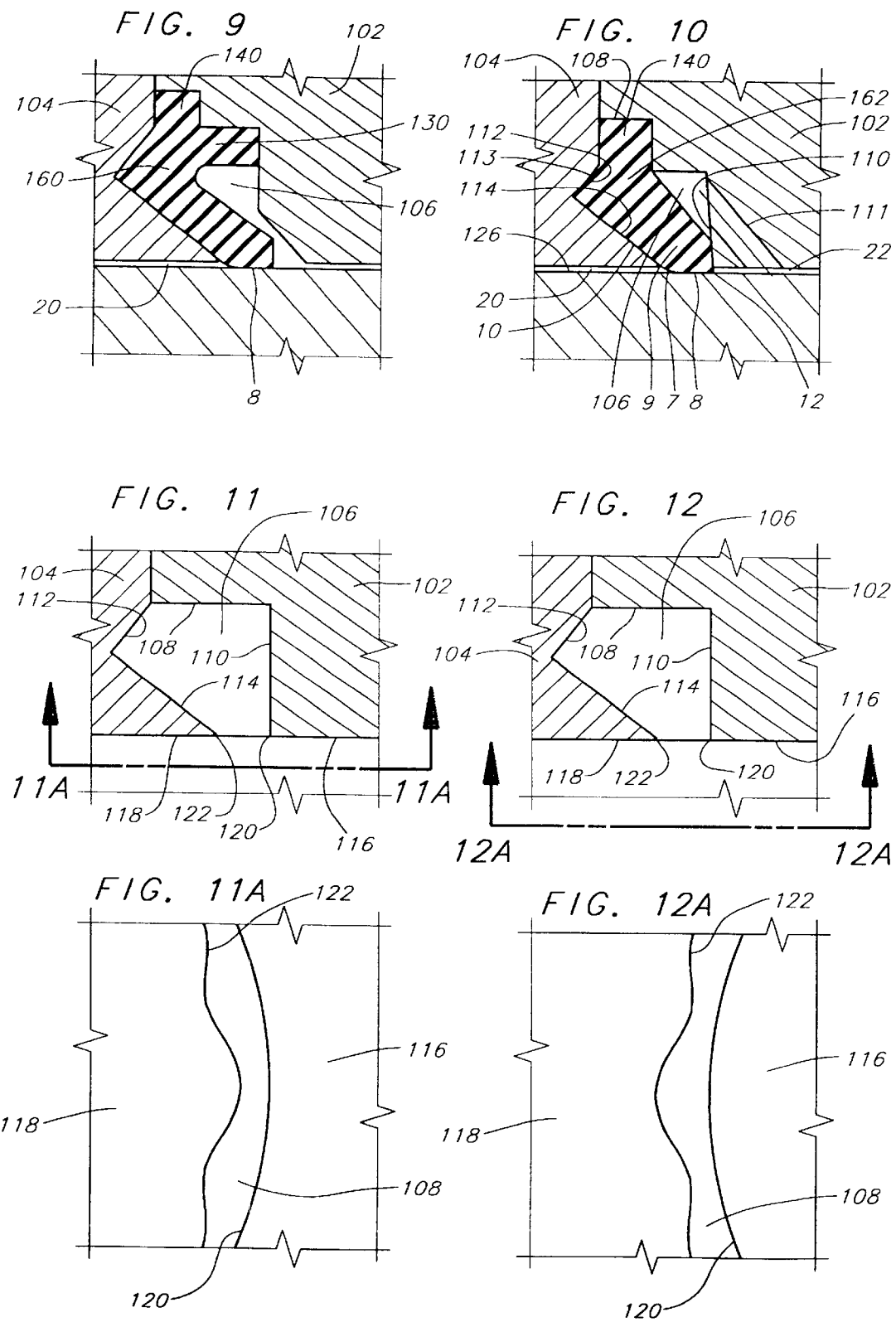

HYDRODYNAMIC PACKING ASSEMBLY

Applicants hereby claim the benefit of U.S. Provisional Application Ser. No. 60/086,129 filed on May 20, 1998 by Jeffrey D. Gobeli, Lannie Dietle, Manmohan S. Kalsi and William T. Conroy entitled "Drilling Swivel Washpipe Assembly", and Ser. No. 60/113,840 filed on Dec. 24, 1998 by Lannie Dietle entitled "Swivel Washpipe Sealing Assembly", which provisional applications are incorporated herein by reference for all purposes.

BACKGROUND OF THE INVENTION

1. Field of the Invention

This invention relates generally to hydrodynamic rotary seal assemblies that are suitable for environmental exclusion and lubricant retention, and for maintaining a film of lubricant at the dynamic sealing interface when the environment pressure is higher than the lubricant pressure. More particularly, the present invention provides a non-circular support surface which efficiently supports the non-circular flank of a hydrodynamic rotary sealing element against environmental pressure, thereby maintaining the functional integrity of the non-circular lubricant edge and the abrupt circular environment edge of the sealing element.

2. Background of the Invention

This invention relates to the commonly assigned prior art hydrodynamic rotary seals and sealing assemblies of U.S. Pat. Nos. 4,610,319, 5,195,754, 5,230,520, 5,678,829, 5,738,358, 5,823,541, 5,873,576, 6,120,036, 6,109,618, and 6,036,192 and PCT WO 95/03504. FIGS. 1–1C of this specification are cross-sectional views which represent prior art which is discussed herein to enhance the readers' understanding of a problem associated with the prior art.

A typical example of such prior art hydrodynamic rotary seals is shown in the uninstalled condition in FIG. 1 generally at 2, and is shown in the intended installed condition in FIG. 1A in a rotary sealing assembly.

The hydrodynamic rotary seal consists of a resilient generally circular body 4, which incorporates a dynamic sealing surface 8, a hydrodynamic inlet curvature 7 and a non-circular flank 10. The dynamic sealing surface 8 has a has an abrupt circular environment exclusion edge 12, and also has a non-circular lubricant edge 14 established by the non-circular flank 10 and hydrodynamic inlet curvature 7.

Such hydrodynamic rotary seals are employed within a seal gland 16 of a housing 18, and are used to retain a lubricant 20 and to exclude an environment 22 which may contain contaminate matter. The dynamic sealing surface 8 establishes a sealing interface when compressed against a mating relatively rotatable surface 24, the footprint of said sealing interface having a footprint lubricant edge 28 and a footprint environment edge 30. The non-circular character of non-circular flank 10 causes the footprint of said sealing interface to be of varying width.

As relative rotation of relatively rotatable surface 24 takes place, the non-circular lubricant edge 14, which has a gradually converging relationship with the relatively rotatable surface 24 as a result of hydrodynamic inlet curvature 7 and non-circular flank 10, generates a hydrodynamic wedging action that forces a lubricant film between dynamic sealing surface 8 and relatively rotatable surface 24 per the teachings of U.S. Pat. No. 4,610,319. The lubricant is wedged into the dynamic sealing interface by the normal component Vn of the rotational velocity V acting on non-circular lubricant edge 14 of dynamic sealing surface 8. This lubricant film physically separates dynamic sealing surface 8 and relatively rotatable surface 24, and thereby prevents the typical frictional wear and heat damage associated with conventional non-hydrodynamic seals, and thereby prolongs seal life. Abrupt circular environment exclusion edge 12 does not generate a hydrodynamic wedging action with the environment in response to relative rotary motion because it is not skewed relative to rotational velocity V, and thereby functions to exclude environment 22 per the teachings of U.S. Pat. No. 4,610,319.

The prior art seals are best suited for applications in which the pressure of lubricant 20 is either higher than, or substantially balanced with, the pressure of environment 22. FIG. 1A shows the seal being held against environment-side gland wall 32 by pressure differential-induced hydrostatic force resulting from the lubricant 20 being at a higher pressure than environment 22. Owing to the complimentary shapes of the seal environmental end 34 and the environment-side gland wall 32, the seal is well supported by environment-side gland wall 32 in a manner that resists distortion and extrusion of body 4 when the pressure of lubricant 20 is higher than the pressure of environment 22.

As depicted in FIG. 1B, if the pressure of environment 22 is substantially higher than the pressure of lubricant 20, the resulting differential pressure-induced hydrostatic force can severely distort body 4, footprint lubricant edge 28 and a footprint environment edge 30. The hydrostatic force presses body 4 against lubricant-side gland wall 36, and can cause body 4 to twist and deform such that non-circular flank 10 and hydrodynamic inlet curvature 7 are substantially flattened against relatively rotatable surface 24. Such distortion and flatting can inhibit or eliminate the intended hydrodynamic lubrication, resulting in premature seal wear because footprint lubricant edge 28 can become substantially circular under such conditions, and the gently converging relationship between body 4 and relatively rotatable surface 24 (which is necessary for hydrodynamic lubrication) can be eliminated. Such distortion can also cause abrupt circular environment exclusion edge 12 to distort to a non-circular configuration and may also cause portions of dynamic sealing surface 8 to lift away from relatively rotatable surface 24, producing a low convergence angle 38 between dynamic sealing surface 8 and relatively rotatable surface 24, and causing the footprint environment edge 30 to become non-circular and skewed relative to rotational velocity V. Such distorted geometry is eminently suitable for the generation of a hydrodynamic wedging action in response to relative rotation of the relatively rotatable surface 24; such wedging action can force environmental contaminants into the sealing interface and cause rapid wear.

To effectively exclude a highly pressurized environment, one must use a pair of oppositely-facing prior art hydrodynamic seals; one to serve as a partition between the lubricant and the environment, and the other to retain the lubricant, which must be maintained at a pressure equal to or higher than the environment. This scheme ensures that neither seal is exposed to a high differential pressure acting from the wrong side, but requires a mechanism to maintain the lubricant pressure at or above the environment pressure. For example, see the first pressure stage of the drilling swivel of U.S. patent application Ser. No. 09/018,261.

Many applications, such as the oilfield drilling swivel, the progressing cavity artificial lift pump, centrifugal pumps, and rotary mining equipment would benefit significantly from a hydrodynamic rotary seal having the ability to operate under conditions where the environment pressure is higher than the lubricant pressure, because the resulting assembly would avoid the complexity and expense associated with lubricant pressurization.

SUMMARY OF THE INVENTION

The objective of the present invention is to provide a simple and compact rotary sealing assembly for lubricant retention and high pressure environmental exclusion which employs the advantage of maintaining a film of lubricant at the dynamic sealing interface during operation to thus promote efficiency and longevity of service.

A principle feature of the present invention is a seal gland wherein at least a portion of the lubricant-side gland wall is a non-circular support surface which supports the non-circular flank and hydrodynamic inlet curvature of a hydrodynamic rotary seal or packing against pressure-induced distortion when the environment pressure is higher than the lubricant pressure, so as to retain the hydrodynamic wedging function of the non-circular lubricant edge of the seal, and so as to retain the exclusionary function of the abrupt circular environment edge of the seal.

Another feature of the present invention is a seal gland wherein at least a portion of the non-circular support surface is angulated such that a component of hydrostatic force helps to support the angulated non-circular flank of a hydrodynamic rotary seal against pressure-induced distortion when the environment pressure is higher than the lubricant pressure.

Another feature of the present invention is the exploitation of the circularity of the environment-side gland wall to retain the circularity and the exclusionary function of the abrupt circular environment edge of a hydrodynamic rotary seal when the environment pressure is higher than the lubricant pressure.

Another feature of the present invention is the use of diagonal compression of a hydrodynamic rotary seal to retain the circularity and the exclusionary function of the abrupt circular environment edge of a hydrodynamic rotary seal when the environment pressure is higher than the lubricant pressure.

Another feature of the present invention is the compression of a portion of a hydrodynamic rotary seal between a first seal housing component and a second seal housing component to establish a seal between the first seal housing component and a second seal housing component and to prevent rotation of the seal within the seal gland.

Another feature of the present invention is the use of a flexible dynamic sealing rim, which may be fabric reinforced, to contain an environment pressure, which is higher than the lubricant pressure.

Another feature of the present invention is the use of a housing indexing element engaging a seal indexing geometry to align the non-circular features of a hydrodynamic seal with the non-circular features of a seal gland during installation of the seal into the gland.

BRIEF DESCRIPTION OF THE DRAWINGS

So that the manner by which the above recited features, advantages and objects of the present invention are attained and can be understood in detail, a comprehensive description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention admits to other equally effective embodiments.

Figure 1:
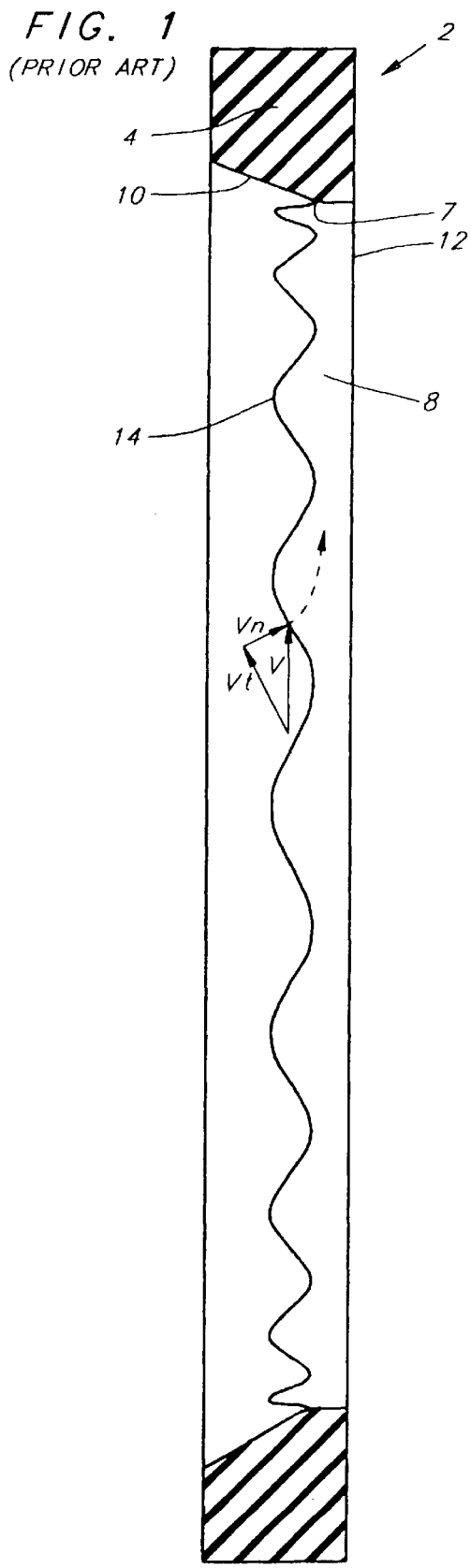
Figure 1A:
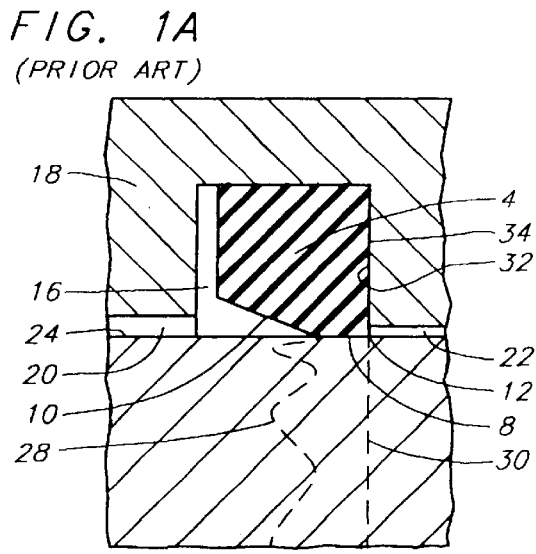
Figure 1B:
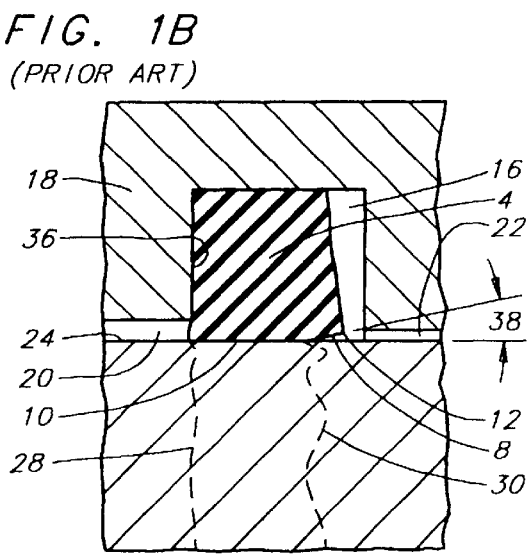
Figure 3:
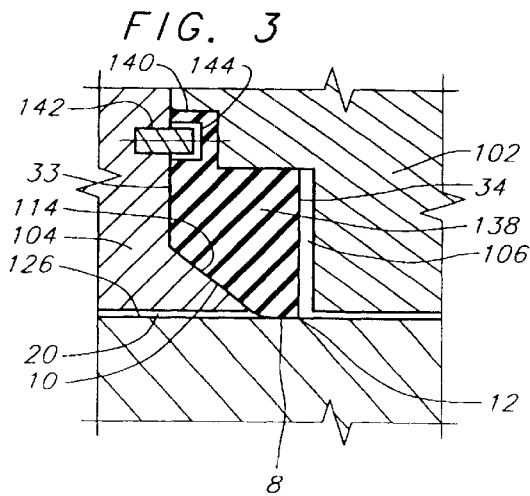
Figure 6:
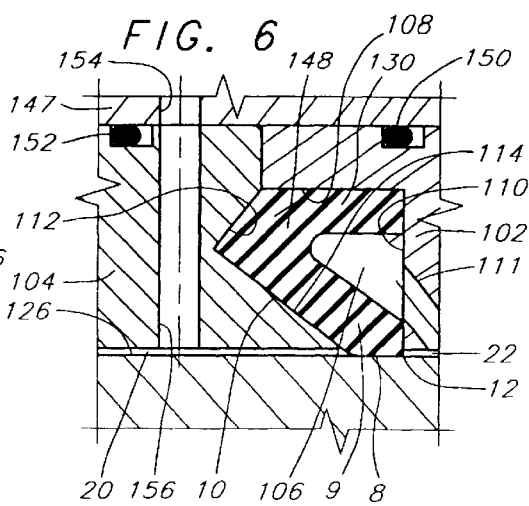
Figure 4:
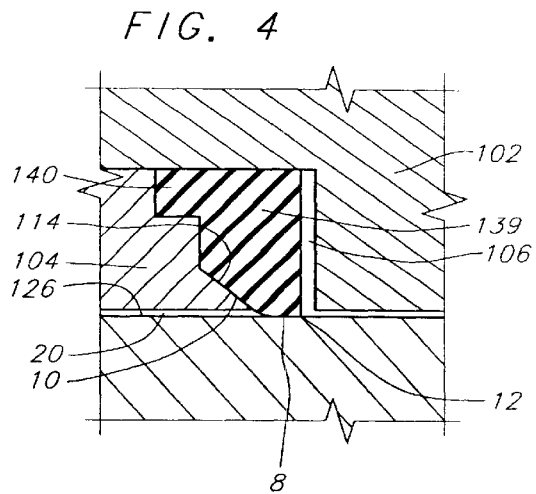
Figure 7:
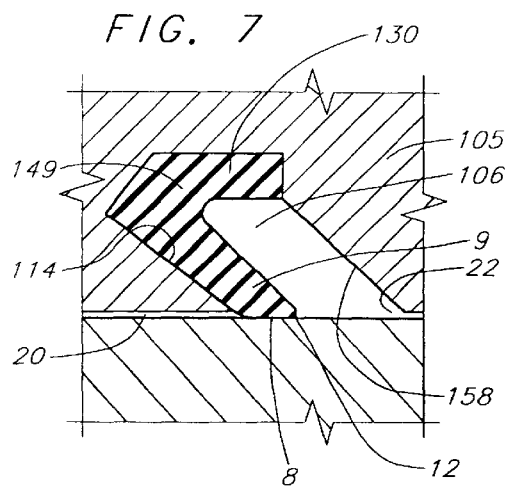
Figure 5:
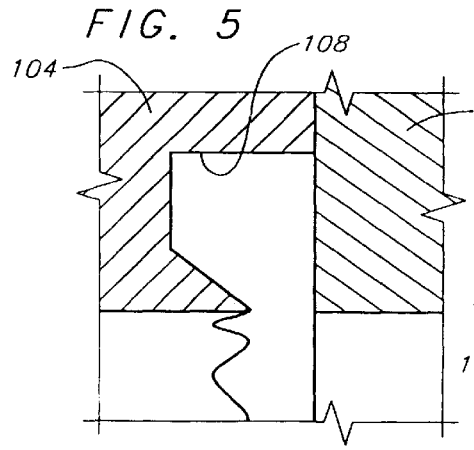
Figure 8:
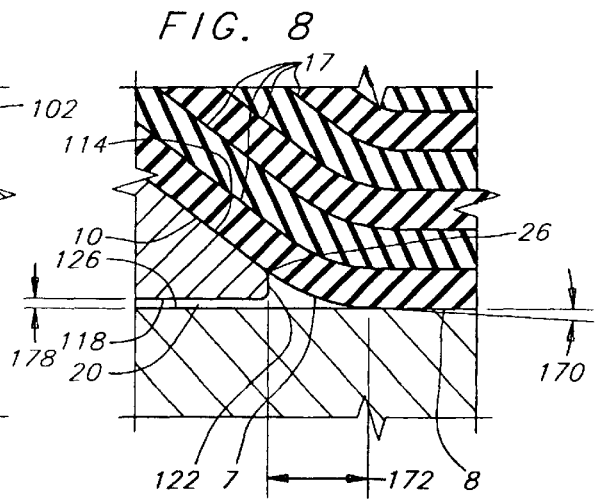
Figure 13:
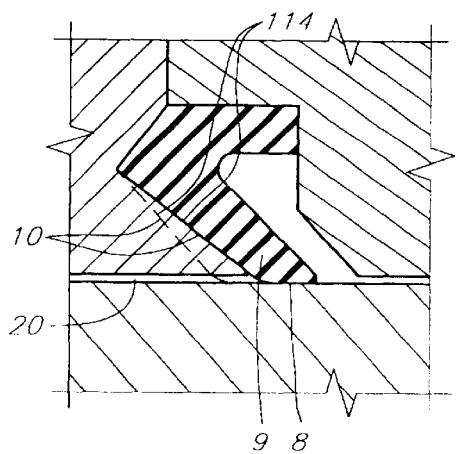
Figure 16:
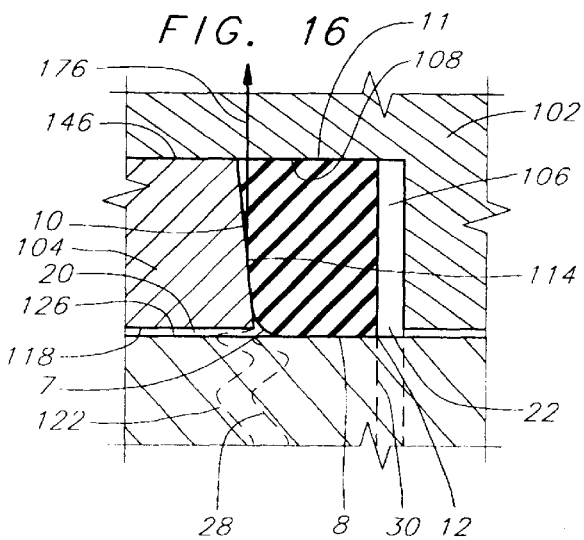
Figure 14:
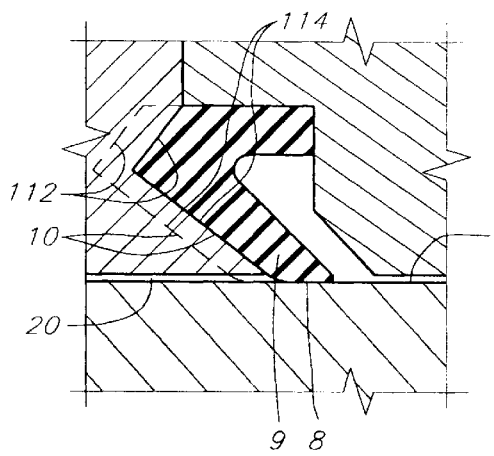
Figure 17:
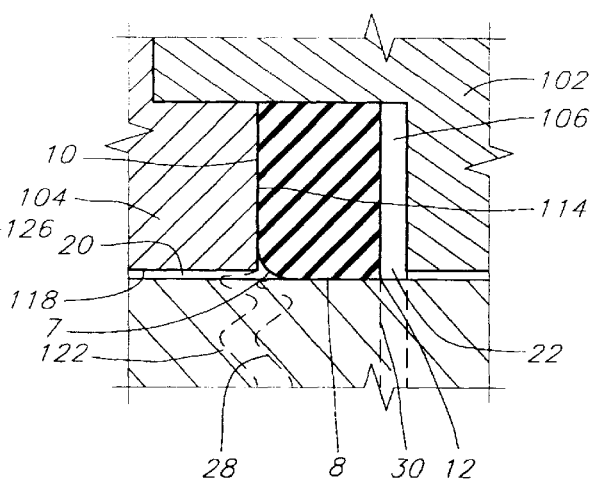
Figure 15:
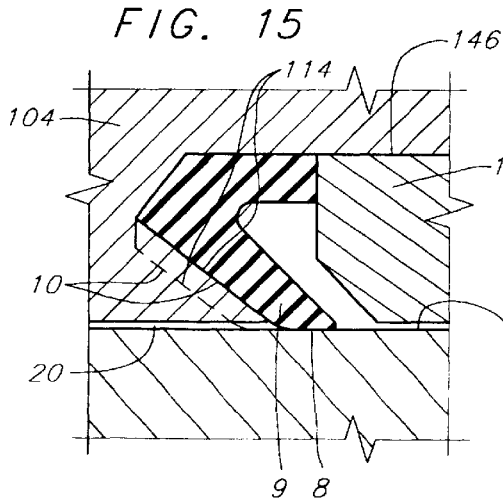
Figure 18:
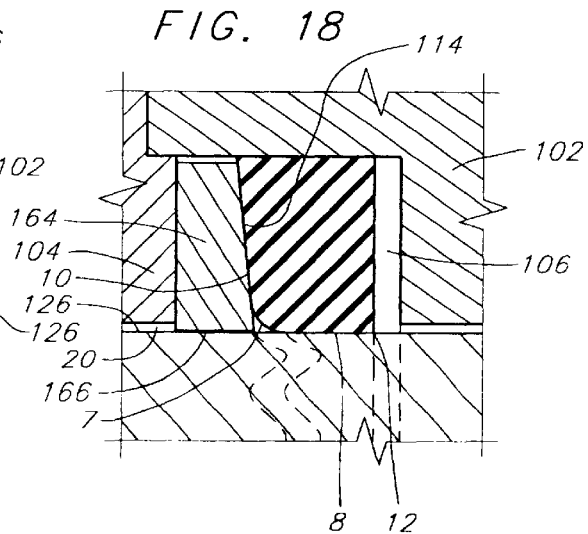

IN THE DRAWINGS:

FIG. 1 is a sectional view of a hydrodynamic seal, shown in the uncompressed condition thereof representing the prior art and incorporating a force vector illustration depicting the theory of hydrodynamic wedging of lubricant into the sealing interface with a relatively rotatable sealing surface;

FIG. 1A is a fragmentary sectional view showing the prior art seal of FIG. 1 being located within a circular seal gland and having hydrodynamically lubricated sealing with a rotary shaft defining a relatively rotatable surface;

FIG. 1B is a fragmentary sectional view similar to that of FIG. 2 and showing the prior art hydrodynamic seal being forced against the lubricant side gland wall with sufficient environment pressure to completely deform the non-circular flank of the seal, eliminating its hydrodynamic lubricating capability, and causing pressure induced development of a footprint hydrodynamic edge at the environment side of the seal;

FIG. 2 is a fragmentary sectional view illustrating a seal housing arrangement defining a seal gland representing the preferred embodiment of the present invention;

FIG. 2A is a fragmentary sectional view illustrating the seal housing arrangement of FIG. 2 and showing a circular hydrodynamic seal being located within the annular seal gland and showing the circular hydrodynamic seal being maintained seated against the non-circular support surface of the seal gland by environment pressure;

FIG. 2B is a fragmentary sectional view illustrating the seal housing arrangement of FIG. 2 and showing a circular multiple modulus hydrodynamic seal being located within the seal gland and being maintained seated against the non-circular support surface of the seal gland by environment pressure;

FIG. 2C is a fragmentary sectional view illustrating the seal housing arrangement of FIG. 2 and showing a circular flexible rimmed hydrodynamic seal being located within the seal gland and being maintained seated against the non-circular support surface of the seal gland by environment pressure communicated into the seal gland via one or more passages;

FIG. 2D is a fragmentary sectional view illustrating the seal housing arrangement of FIG. 2 and showing a circular flexible rimmed hydrodynamic seal being located within the seal gland and being maintained seated against the non-circular support surface of the seal gland by axial mechanical compression and by environment pressure communicated into the seal gland past the flexible dynamic sealing rim thereof;

FIG. 2E is a fragmentary sectional view illustrating the seal housing arrangement of FIG. 2C and showing a circular hydrodynamic seal having a radially inner portion of the environment side thereof disposed in engagement with the environment side gland wall of the seal gland and with the seal, if desired, being in diagonal mechanical compression to maintain the abrupt circular environment edge of the seal;

FIG. 3 is a fragmentary sectional view illustrating a hydrodynamic seal of the general form shown in FIG. 2A and having an annular rim interfitting with one or more housing indexing elements and captured within a corresponding internal gland recess and supporting the non-circular flank of the seal for preserving hydrodynamic lubricant wedging action thereof;

FIG. 4 is a fragmentary sectional view illustrating formation of a seal gland having a geometry substantially similar to the seal gland geometry of FIG. 2 by first and second seal housing components employing a piloting interface;

FIG. 5 is a fragmentary sectional view illustrating formation of a seal gland by first and second seal housing components and with the static peripheral sealing surface of the seal gland being defined by the second seal housing component;

FIG. 6 is a fragmentary sectional view illustrating a seal gland embodying the principles of the present invention and showing that a lubricant side wall portion adjacent to the static peripheral sealing surface may be angulated with respect the environmental side gland wall;

FIG. 7 is a fragmentary sectional view illustrating a seal gland according to the present invention and showing that a clearance geometry can be employed in a one piece seal to provide clearance between the first seal housing component and the flexible dynamic sealing rim of the hydrodynamic seal;

FIG. 8 is an enlarged fragmentary sectional view illustrating the hydrodynamic inlet curvature of the seal gland and seal assembly of the present invention showing the geometry thereof for promoting optimum extrusion resistance;

FIG. 9 is a fragmentary sectional view illustrating a hydrodynamic seal constructed generally in accordance with the seal geometry shown in FIG. 7 and having an annular rim being clamped between the first and second housing components to prevent rotation of the seal within the seal gland;

FIG. 10 is a fragmentary sectional view illustrating a hydrodynamic seal constructed generally in accordance with the seal geometry shown in FIG. 9 with the exception that the static peripheral sealing rim has been eliminated and also incorporating an annular rim being clamped between the first and second housing components to prevent rotation of the seal within the seal gland;

FIG. 11 is a fragmentary sectional view illustrating a seal gland being defined by first and second seal housing components and being oriented for face-sealing with a circular planar relatively rotatable surface;

FIG. 11A is a fragmentary sectional view taken along the viewing plane 11A—11A of FIG. 11 and illustrating a hydrodynamic seal embodying the principles of the present invention in a face-sealing arrangement;

FIG. 12 is a fragmentary sectional view illustrating a seal gland being defined by first and second seal housing components and being oriented for face-sealing with a circular planar relatively rotatable surface;

FIG. 12A is a fragmentary sectional view taken along the viewing plane 12A—12A of FIG. 11 and illustrating a hydrodynamic seal embodying the principles of the present invention in a face-sealing arrangement;

FIG. 13 is a fragmentary sectional view illustrating a seal gland being defined by first and second seal housing components and showing that the angle of the non-circular flank of the seal and the non-circular support surface of the second seal housing component varies about the circumference thereof;

FIG. 14 is a fragmentary sectional view illustrating a seal gland and hydrodynamic seal representing a preferred embodiment of the present invention and being defined by first and second seal housing components and further showing variation of the position of the non-circular flank and non-circular support surface of the seal in a direction substantially parallel to the relatively rotatable surface to create the non circular flank;

FIG. 15 is a fragmentary sectional view similar to that of FIG. 14 and showing variation of the non-circular flank of the seal and non-circular support surface of the second seal housing component in a direction substantially perpendicular to the relatively rotatable surface;

FIG. 16 is a fragmentary sectional view of an alternative embodiment of the present invention showing that the non-circular support surface can form the entire lubricant side gland wall and showing that the non-circular flank of the seal can extend from the hydrodynamic inlet curvature to the static sealing surface;

FIG. 17 is a fragmentary sectional view depicting another alternative embodiment of the present invention showing interfitting of the first and second seal housing components in a piloting arrangement to define the seal gland and the non-circular support surface varies substantially perpendicularly to the relatively rotatable surface and intersects the lubricant side clearance surface to define the non-circular intersection; and FIG. 18 is a fragmentary sectional view presenting a further alternative embodiment of the present invention showing a seal gland formed by interfitting first and second seal housing components and showing that the non-circular support surface may be incorporated as part of an insert which is disposed within the seal gland along with a hydrodynamic seal.

DETAILED DESCRIPTION OF THE TYPICAL EMBODIMENTS OF FIGS. 2–2E

The section view of FIG. 2 shows a typical seal housing arrangement of the present invention, without a hydrodynamic rotary seal being installed, and FIGS. 2A–2E show several different types of hydrodynamic rotary seals installed within the typical housing arrangement in sealing relation to a relatively rotatable surface.

Referring now to FIG. 2, a typical seal housing arrangement of the present invention is shown generally at 100 which consists of seal housing having a first seal housing component 102 and a second seal housing component 104 which fit together in cooperative assembly to form a seal gland 106 consisting of a static sealing surface 108, an environmental-side gland wall 110 and a lubricant-side gland wall extending from corner 109 to non-circular intersection 122. At least a portion of said lubricant-side gland wall establishes a non-circular support surface 114, and any remaining portion of said lubricant side gland wall establishes a lubricant-side wall portion 112. Non-circular support surface 114 may be angulated relative to lubricant side clearance surface 118 in acute angular relation. The hydrodynamic seals of FIGS. 2A–18 are used to retain a lubricant 20 and to exclude an environment 22 which may contain contaminate matter. At least a portion of environmental-side gland wall 110 may be circular in any of the FIGS. 2–18.

First seal housing component 102 and second seal housing component 104 incorporate respective environment side and lubricant side clearance surfaces 116 and 118 for facing a relatively rotatable surface. Environmental-side gland wall 110 and environment side clearance surface 116 intersect to form a circular intersection 120. Non-circular support surface 114 and lubricant side clearance surface 118 intersect in acute angular relation to form a non-circular intersection 122.

First seal housing component 102 and second seal housing component 104 may be retained or attached together by any suitable retaining or attachment means, including threaded means such as threads, bolts, screws, studs, hammer unions, etc, and including external clamping means, bayonet-type latches, deformable rims or tangs, retaining ring(s), welding, soldering, bonding, friction, interference fit, etc. without departing from the spirit or scope of the invention. First seal housing component 102 and second seal housing component 104 may be made from any suitable material, such as metal, plastic or reinforced plastic.

In FIG. 2A an annular seal 124 constructed in accordance with U.S. Pat. No. 4,610,319 is installed within seal gland 106, and is compressed in sealing relation with static sealing surface 108 and with relatively rotatable surface 126. Dynamic sealing surface 8 establishes a dynamic sealing interface with respect to relatively rotatable surface 126, the footprint of said dynamic sealing interface having a footprint lubricant edge 28 and a footprint environment edge 30. All of the seals of FIGS. 2A–18 define a dynamic sealing surface 8 having an abrupt circular environment exclusion edge and a non-circular lubricant edge as discussed in conjunction with the prior art of FIG. 1, wherein the dynamic sealing surface establishes a dynamic sealing interface with respect to the relatively rotatable surface, the footprint of said dynamic sealing interface having a footprint lubricant edge of non-circular configuration and a footprint environment edge of circular configuration. Non-circular support surface 114 inter-fits with, and supports non-circular flank 10 in a nested relationship so that the pressure of environment 22 cannot flatten non-circular flank 10 against relatively rotatable surface 126, thereby preserving the hydrodynamic wedging action, and thereby maintaining abrupt circular environment exclusion edge 12 and footprint environment edge 30 in the intended substantially circular configuration for efficient environmental exclusion. As can also be appreciated, non-circular support surface 114 also prevents backwards installation of the seal.

If annular seal 124 were to spin within seal gland 106, the nesting fit between non-circular flank 10 and non-circular support surface 114 might be lost, causing abrupt circular environment exclusion edge 12 to be forced to a non-circular configuration. The interlocking relationship between non-circular flank 10 and non-circular support surface 114 helps to inhibit annular seal 124 from spinning within the gland. The contact between annular seal 124 and static sealing surface 108 also helps to inhibit annular seal 124 from spinning within the gland.

For the convenience of illustrating footprint environment edge 30, non-circular intersection 122 and non-circular footprint lubricant edge 28, FIGS. 2–2E portray an arrangement wherein relatively rotatable surface 126 and static sealing surface 108 are substantially cylindrical, such as would be encountered if relatively rotatable surface 126 were a shaft, washpipe, or wear sleeve. Such portrayal is not intended to limit the scope of the invention, for the 15 invention is equally effective when relatively rotatable surface 126 and static sealing surface 108 are substantially planar or substantially conical, or relatively rotatable surface 126 forms a cylindrical bore.

Environment side clearance surface 116 and lubricant side clearance surface 118 of FIG. 2A (and other figures herein) may establish a journal bearing relationship with relatively rotatable surface 126; said journal bearing relationship may be used to guide either the relatively rotatable surface 126 relative to environment side clearance surface 116 and lubricant side clearance surface 118, or to guide environment side clearance surface 116 and lubricant side clearance surface 118 in relationship to relatively rotatable surface 126. The use of a such a journal bearing relationship, in addition to providing guidance, also provides the minimum possible extrusion gap. As a general guide, the minimum journal bearing fit at extrusion gap 178, considering the accumulative effect of tolerances, pressure breathing, and differential thermal expansion, may approximate an ANSI RC 3 fit.

Annular seal 124, and the other hydrodynamic seals described in this specification, may be composed of any suitable sealing material, including elastomeric or rubber-like materials and various polymeric materials, and including different materials bonded together to form a composite structure or inter-fitted together; however it is preferred that the portions of the hydrodynamic seal adjacent to dynamic sealing surface 8 and non-circular flank 10 be made from a reinforced material, such as multiple ply fabric reinforced elastomer having at least some of the plies substantially aligned with dynamic sealing surface 8 and non-circular flank 10, as described in more detail in conjunction with FIG. 8.

Without departing from the spirit or scope of the present invention, the geometry of non-circular flank 10, footprint lubricant edge 28, non-circular intersection 122 and non-circular support surface 114 of FIGS. 2–18 can take any suitable design configuration that results in a gradually converging, non-circular geometry at the lubricant side of the dynamic interface that is suitable for promoting hydrodynamic wedging of lubricant into the dynamic interface in response to relative rotation.

The non-circular footprint lubricant edge 28 can take any form which is skewed with respect to the direction of relative rotation, and could take the form of one or more convolution/waves of any form including a sine, saw-tooth or square wave configuration, or plural straight or curved segments forming a tooth-like pattern, or one or more parabolic curves, cycloid curves, witch/versa curves, elliptical curves, etc. or combinations thereof, including any of the design configurations shown in U.S. Pat. Nos. 4,610,319, and 6,109,618.

The non-circular flank 10 can take any form of surface which is useful to establishing the non-circular, skewed character of footprint lubricant edge 28, and could take the form of one or more convoluted/wavy surfaces of any form including a sine, saw-tooth or square wave configuration, or plural straight or curved segments forming a tooth-like pattern, or one or more parabolic curves, cycloid curves, witch/versa curves, elliptical curves, etc. or combinations thereof, including any of the design configurations shown in U.S. Pat. Nos. 4,610,319 and 6,109,618.

Likewise, the non-circular character of non-circular intersection 122 and non-circular support surface 114 can take any suitable design configuration for supporting the non-circular flank 10 and footprint lubricant edge 28 to achieve a gradually converging, non-circular geometry at the lubricant side of the dynamic interface for promoting hydrodynamic wedging. Non-circular intersection 122 can take any of the forms discussed above in conjunction with footprint lubricant edge 28, and non-circular support surface 114 can take any of the forms discussed above in conjunction with non-circular flank 10.

In FIG. 2B a multiple modulus seal constructed in accordance with U.S. Pat. No. 5,738,358 is shown which has a first generally circular portion 132 with a predetermined modulus of elasticity, and which has a second generally circular portion 134 with a modulus of elasticity higher than said predetermined modulus of elasticity for enhanced extrusion resistance. Non-circular support surface 114 inter-fits with, and supports non-circular flank 10 so that environmental pressure cannot flatten non-circular flank 10 against relatively rotatable surface 126.

In FIG. 2C a flexible rimmed annular seal 128 has a flexible dynamic sealing rim 9 constructed in accordance with U.S. Pat. No. 5,678,829. Flexible rimmed annular seal 128 is installed within seal gland 106 in sealing relation with static sealing surface 108 and with relatively rotatable surface 126. Static sealing rim 130 of flexible rimmed annular seal 128 may be installed with interference between environmental-side gland wall 110 and lubricant-side wall portion 112, as shown, to establish a seal between first seal housing component 102 and second seal housing component 104; such interference is very desirable in that it also positively prevents flexible rimmed annular seal 128 from spinning within seal gland 106.

Dynamic sealing surface 8 establishes a dynamic sealing interface with respect to relatively rotatable surface 126. Non-circular support surface 114 inter-fits with, and supports non-circular flank 10 so that environmental pressure cannot flatten non-circular flank 10 against relatively rotatable surface 126, thereby preserving the hydrodynamic wedging action, and thereby maintaining abrupt circular environment exclusion edge 12 and footprint environment edge 30 in the intended substantially circular configuration for efficient environmental exclusion. For establishing optimum circularity of abrupt circular environment exclusion edge 12, flexible dynamic sealing rim 9 may abut with environmental-side gland wall 110 as shown, provided that a pressure communication passage 111 of a suitable type is provided to insure pressure communication to seal gland 106 interior of flexible dynamic sealing rim 9, which depends partially on environmental pressure for energization against relatively rotatable surface 126. When flexible dynamic sealing rim 9 abuts with environmental-side gland wall 110 as shown for establishing optimum circularity of abrupt circular environment exclusion edge 12, at least a portion of environmental-side gland wall 110 should be circular.

Flexible rimmed annular seal 128 may be composed of any suitable sealing material, including elastomeric or rubber-like materials and various polymeric materials, and including different materials bonded together to form a composite structure; however it is preferred that flexible dynamic sealing rim 9 be made from a reinforced material such as multiple ply fabric reinforced elastomer having at least some of the plies substantially aligned with dynamic sealing surface 8 and non-circular flank 10.

The geometry of non-circular flank 10, footprint lubricant edge 28 and non-circular support surface 114 can take any suitable design configuration that results in a gradually converging, non-circular geometry for promoting hydrodynamic wedging without departing from the spirit or scope of the present invention.

In FIG. 2D a flexible rimmed annular seal 128 has flexible dynamic sealing rim 9 constructed in accordance with U.S. Pat. No. 5,678,829. For establishing optimum lip flexibility and for providing optimum communication of the pressure of environment 22 to seal gland 106 interior of flexible dynamic sealing rim 9, a clearance relationship between flexible dynamic sealing rim 9 and environmental-side gland wall 110 is employed.

In FIG. 2E an annular seal 136 is constructed generally in accordance with U.S. Pat. No. 4,610,319, however for establishing optimum circularity of abrupt circular environment exclusion edge 12, at least a portion of annular seal 136 abuts with environmental-side gland wall 110 as shown. The seal may be in diagonal compression per the teachings of PCT WO 95/03504 if desired. Unlike PCT WO 95/03504, wherein the abrupt circular environment edge must unavoidably shuttle within the gland in response to pressure reversals, the abrupt circular environment exclusion edge 12 of FIG. 2E is stabilized against pressure reversal-induced shuttling by environmental-side gland wall 110 on one side, and by non-circular support surface 114 on the other side, and is therefore more abrasion resistant. When at least a portion of annular seal 136 abuts with environmental-side gland wall 110 as shown for establishing optimum circularity of abrupt circular environment exclusion edge 12, at least a portion of environmental-side gland wall 10 should be circular. Pressure communication passage 111 in the form of at least one (and preferably a plurality) of holes is provided to insure pressure communication to seal gland 106. Pressure communication passage 111 could also take the form of slots without departing from the spirit or scope of the invention.

Non-circular support surface 114 inter-fits with, and supports non-circular flank 10 in a nested relationship so that the pressure of environment 22 cannot flatten non-circular flank 10 against relatively rotatable surface 126.

DETAILED DECISION OF THE TYPICAL EMBODIMENTS OF FIGS. 3–10

In FIG. 3 an annular seal 138 constructed generally in accordance with U.S. Pat. No. 4,610,319 is installed within seal gland 106. Non-circular support surface 114 inter-fits with, and supports non-circular flank 10 in a nested relationship so that environmental pressure cannot flatten non-circular flank 10 against relatively rotatable surface 126, thereby preserving hydrodynamic wedging action, and thereby maintaining abrupt circular environment exclusion edge 12 in the intended substantially circular configuration for efficient environmental exclusion. Retention section 140 is clamped between first seal housing component 102 and second seal housing component 104 to prevent circumferentail rotation of annular seal 138 within seal gland 106 and to provide static sealing between first seal housing component 102 and second seal housing component 104. In its simplest form, retention section 140 may be an annular rim, but may take other specific forms without departing from the spirit or scope of the invention. For example, retention section 140 may be of interrupted rim configuration, or may be formed by retention recesses. The surfaces, which clamp retention section 140, may be roughened if desired.

If desired, a housing indexing element 142 which engages a corresponding seal indexing geometry 144 may be used to inhiibt circumferential rotation of the seal and to facilitate alignment during installation. Any of a number of suitable alternative types of housing indexing element 142 and seal indexing geometry 144 may be used without departing from the spirit and scope of this invention; for example, a pin or tang extending from the seal could engage a recess in first seal housing component 102 or second seal housing component 104.

Retention section 140 may be employed at seal lubricant end 33 as shown, or at seal environmental end 34.

FIG. 4 shows an alternate orientation of retention section 140 which is particularly useful when relatively rotatable surface 126 is substantially planar, but which may also be used when relatively rotatable surface 126 is substantially cylindrical or substantially conical. Retention section 140 may be clamped between first seal housing component 102 and second seal housing component 104 to prevent rotation of annular seal 139 within seal gland 106 and to provide static sealing between first seal housing component 102 and second seal housing component 104. In its simplest form, retention section 140 may be an annular rim, but may take other specific forms without departing from the spirit or scope of the invention. For example, retention section 140 may be of interrupted rim configuration, or may be formed by retention recesses.

Non-circular support surface 114 inter-fits with, and supports non-circular flank 10 so that environmental pressure cannot flatten non-circular flank 10 against relatively rotatable surface 126, thereby preserving the hydrodynamic wedging action, and thereby maintaining abrupt circular environment exclusion edge 12 in the intended substantially circular configuration for efficient environmental exclusion.

FIG. 5 shows that static sealing surface 108 may be a part of second seal housing component 104 if desired, instead of being a part of first seal housing component 102.

FIG. 6 shows that lubricant-side wall portion 112 adjacent to static sealing surface 108 may be angulated at an obtuse angle with respect to environmental-side gland wall 110 if desired. Flexible dynamic sealing rim 9 may be compressed diagonally between lubricant-side wall portion 112 and environmental-side gland wall 110 to facilitate maintenance of abrupt circular environment exclusion edge 12 in the desired circular configuration. When Flexible dynamic sealing rim 9 is compressed diagonally between lubricant-side wall portion 112 and environmental-side gland wall 110 to facilitate maintenance of abrupt circular environment exclusion edge 12 as shown, at least a portion of environmental-side gland wall 110 should be circular. A pressure communication passage 111 is incorporated to communicate the pressure of environment 22 to seal gland 106. A component of the diagonal compression between lubricant-side wall portion 112 and environmental-side gland wall 110 also serves to hold dynamic sealing surface 8 against relatively rotatable surface 126. The abrupt circular environment exclusion edge 12 of FIG. 6 is stabilized against pressure reversal-induced shuttling by environmental-side gland wall 110 on one side, and by non-circular support surface 114 on the other side.

As discussed above in conjunction with FIG. 2C, it is important that the annular seal 148 be prevented from rotating within seal gland 106. Accordingly, Static sealing rim 130 may be clamped between first seal housing component 102 and second seal housing component 104 to prevent rotation of annular seal 148 within seal gland 106 and to provide static sealing between first seal housing component 102 and second seal housing component 104. The surfaces which clamp Static sealing rim 130 may be roughened if desired for additional friction.

FIG. 6 also shows that first seal housing component 102 and second seal housing component 104 may be fitted with a separate machine housing 147, which may take any one of a number of suitable forms without departing from the spirit or scope of this invention. FIG. 6 also shows that, if desired, first seal housing component 102 and second seal housing component 104 may have a sealed relationship with machine housing 147 by virtue of respective circular sealing elements 150 and 152.

FIG. 6 also shows that fluid communication may be accomplished through machine housing 147 by virtue of conduits 154 and 156. If desired, two or more of the seal assemblies of FIG. 6 can be used in a stack to provide redundancy; in such cases conduits 154 and 156 may be employed to introduce lubricant between the seals, and may be used to provide staging pressure per the teachings of commonly assigned U.S. patent application Ser. No. 09/018,261 so that each seal is exposed to a pressure differential which is only a fraction of the pressure of environment 22.

FIG. 7 shows that annular seal 149 may be installed within a seal gland 106 in a one-piece seal housing 105 if desired; such installation may be achieved by molding annular seal 149 in place, or by installing it through the opening between clearance geometry 158 and non-circular support surface 114. FIG. 7 also shows that a clearance geometry 158 can be employed to provide clearance for flexible dynamic sealing rim 9 of annular seal 149 to provide for maximum flexibility and freedom of motion of flexible dynamic sealing rim 9 and to provide for communication of the pressure of Environment 22 to seal gland 106. FIG.7 also shows that static sealing rim 130 can be shorter relative to flexible dynamic sealing rim 9 if desired.

FIG. 8 shows an enlarged sectional view of the present invention in the critical region of hydrodynamic inlet curvature 7, and is applicable to FIGS. 2A–4, 6, 7, 9, 10 and 13–18. For optimum extrusion resistance, the non-circular intersection 122 between non-circular support surface 114 and lubricant side clearance surface 118 should be blunted and rounded as shown to avoid anchoring and cutting the seal. Preferably radius 26 should be in the range of approximately 0.005–0.015 inch.

It is preferred that the potions of the hydrodynamic seal adjacent to the hydrodynamic inlet curvature 7, dynamic sealing surface 8 and non-circular flank 10 be made from a reinforced material, such as multiple ply fabric reinforced elastomer having at least some of the plies 17 thereof substantially aligned with hydrodynamic inlet curvature 7, dynamic sealing surface 8 and non-circular flank 10, as shown, for maximum extrusion resistance, and so that dynamic sealing surface 8 may be a smoothly molded surface (rather than the reinforcement-induced irregular surface roughness common to prior art seals such as the seal of U.S. Pat. No. 2,394,800) so as not to interfere with the functions of hydrodynamic inlet curvature 7, dynamic sealing surface 8, and abrupt circular environment exclusion edge 12 (see FIG. 6).

A minimal extrusion gap 178 is defined between relatively rotatable surface 126 and lubricant side clearance surface 118, and lubricant side clearance surface 118 may establish a journal bearing relationship with relatively rotatable surface 126 if desired.

A principal advantage of the present invention is that non-circular support surface 114 supports non-circular flank 10 of annular seal 148 and supports hydrodynamic inlet curvature 7 from being flattened completely against relatively rotatable surface 126, thereby preserving an efficient, gently converging hydrodynamic wedging angle 170 between hydrodynamic inlet curvature 7 and relatively rotatable surface 126 for maintaining efficient hydrodynamic film lubrication of dynamic sealing surface 8. This makes the seal run much cooler than comparable non-hydrodynamic seals, therefore the seal retains a relatively high modulus of elasticity for optimum extrusion resistance.

The pressure of environment 22 causes the hydrodynamic inlet curvature 7 to flex toward extrusion gap 178, rather than forcing it to extrude or bulge into extrusion gap 178. As a result, the hydrodynamic inlet curvature 7 drapes between non-circular intersection 122 and relatively rotatable surface 126, and the generally unavoidable relative dynamic runout motion between second seal housing component 104 and relatively rotatable surface 126 is absorbed over the relatively long flexure length 172 by flexing of hydrodynamic inlet curvature 7. Since the relative dynamic runout motion is absorbed over the relatively long flexure length 172 by flexing, the resulting local stresses in the hydrodynamic seal are relatively low, and do not exceed the fatigue limit of the material used to form the hydrodynamic seal. Extrusion damage is therefore minimized, and integrity of hydrodynamic inlet curvature 7 is maintained.

When a seal sustains repetitive extrusion damage from the combination of high pressure and runout, the high frequency of compression, flexing and tearing of the extruded material also generates substantial heat which negatively affects film thickness and modulus of elasticity; the improved extrusion resistance of the present invention minimizes this effect.

Propagation of extrusion damage across the dynamic sealing surface 8 would physically disrupt the lubricant film, and the resulting frictional heat would further disrupt the film by reducing lubricant viscosity and by promoting heat embrittlement and film disruptive cracking of dynamic sealing surface 8, and would further reduce extrusion resistance by lowering the modulus of elasticity of the seal. Because extrusion damage is minimized by the present invention, film thickness is maintained, and running temperature and temperature-related modulus loss are moderated. The added extrusion resistance of the assembly therefore provides means for controlling and maintaining lubricant film thickness.

Even if extrusion damage is sustained by hydrodynamic inlet curvature 7, the skew of footprint lubricant edge 28 is still maintained by non-circular intersection 122 and non-circular support surface 114, and footprint lubricant edge 28 continues to provide a degree of hydrodynamic lubrication, and the dynamic sealing interface remains far better lubricated than a conventional non-hydrodynamic rotary seal having no lubricant-side skew.

FIG. 9 shows an annular seal 160 constructed generally in accordance with the seal of FIG. 7, but with the addition of a retention section 140 clamped between first seal housing component 102 and second seal housing component 104 to prevent rotation of annular seal 160 within seal gland 106 and to provide static sealing between first seal housing component 102 and second seal housing component 104.

FIG. 10 shows an annular seal 162 constructed generally in accordance with annular seal 160 of FIG. 9, with the exception that the static sealing rim 130 of FIG. 9 has been eliminated. Retention section 140 is clamped between first seal housing component 102 and second seal housing component 104 to prevent rotation of annular seal 162 within seal gland 106, and establishes sealing between first seal housing component 102 and second seal housing component 104. In its simplest form, retention section 140 may be an annular rim, but may take other specific forms without departing from the spirit or scope of the invention. For example, retention section 140 may be of interrupted rim configuration, or may be formed by retention recesses.

As with FIG. 6, flexible dynamic sealing rim 9 may be compressed diagonally between lubricant-side wall portion 112 and environmental-side gland wall 110 to facilitate maintenance of abrupt circular environment exclusion edge 12 in the desired circular configuration. If desired, environmental-side gland wall 110 may be angulated relative to relatively rotatable surface 126, as shown. When Flexible dynamic sealing rim 9 is compressed diagonally between lubricant-side wall portion 112 and environmental-side gland wall 110 to facilitate maintenance of abrupt circular environment exclusion edge 12 as shown, at least a portion of environmental-side gland wall 110 should be circular. A pressure communication passage 111 is incorporated to communicate the pressure of environment 22 to seal gland 106. A component of the diagonal compression between lubricant-side wall portion 112 and environmental-side gland wall 110 also serves to hold dynamic sealing surface 8 against relatively rotatable surface 126. Non-circular support surface 114 inter-fits with, and supports non-circular flank 10 in a nested relationship so that environmental pressure cannot flatten non-circular flank 10 against relatively rotatable surface 126, thereby preserving the hydrodynamic wedging action. The geometry of non-circular flank 10 can take any suitable design configuration that results in a gradually converging, non-circular geometry at the lubricant side of the dynamic interface for promoting hydrodynamic wedging without departing from the spirit or scope of the present invention.

The contact pressure at the interface between the dynamic sealing surface 8 and the relatively rotatable surface 126 is one of several important factors controlling hydrodynamic performance because it directly influences hydrodynamic film thickness, which in turn influences the shear rate of the lubricant film and the amount of asperity contact between the seal and shaft (if any), and therefore influences the magnitude of heat generated at the dynamic interface. Management of interfacial contact pressure is particularly important in applications where the pressure of the environment is higher than the pressure of the lubricant.

The flexibility of flexible dynamic sealing rim 9 relieves some of the contact pressure at the interface between the dynamic sealing surface 8 and the relatively rotatable surface 126 that would otherwise occur if the seal were of the direct compression type (such as the seal of FIG. 3), thereby helping to assure sufficient hydrodynamic lubrication. The seal of FIG. 10 achieves the control of interfacial contact pressure per the general flexible rim teaching of commonly assigned U.S. Pat. No. 5,678,829, but accomplishes it in a much simpler embodiment which simultaneously achieves the positive anti-rotation which is highly desirable for use in conjunction with non-circular support surface 114. Unlike the seals of U.S. Pat. No. 5,678,829, surface 113 of the seal of FIG. 10 provides for efficient diagonal compression of flexible dynamic sealing rim 9 to provide circularity control of abrupt circular environment exclusion edge 12. Unlike the seals of U.S. Pat. No. 5,678,829, the seal of FIG. 10 does not employ a static sealing rim to react the compression of flexible dynamic sealing rim 9 against relatively rotatable surface 126, rather the reaction is provided by clamping of retention section 140.

Annular seal 162 also utilizes a smaller gland than the seals of U.S. Pat. No. 5,678,829, which means that more material is available in first seal housing component 102 to maintain rigidity under pressure loading. Annular seal 162 is also easier to mold than the seals of U.S. Pat. No. 5,678,829 when fabric reinforcement is employed, and is more conservative of raw material, which is important when expensive high-temperature elastomers such as perfluoroelastomers are employed.

Annular seal 162 may be composed of any suitable sealing material, including elastomeric or rubber-like materials and various polymeric materials, and including different materials assembled or bonded together to form a composite structure; however it is preferred that the portions of annular seal 162 adjacent to the dynamic sealing surface 8 and non-circular flank 10 be made from a reinforced material, such as multiple ply fabric reinforced elastomer having at least some of the plies substantially aligned with dynamic sealing surface 8 and non-circular flank 10, as discussed in detail in conjunction with FIG. 8.

DETAILED DESCRIPTION OF THE EMBODIMENTS OF FIGS. 11–12A

FIG. 11A is a view taken along viewing plane 11A—11A of FIG. 11, and FIG. 12A is a view taken along viewing plane 12A—12A of FIG. 12. FIGS. 11–12A clearly illustrate that the present invention may be also used in a face-sealing arrangement.

First seal housing component 102 and a second seal housing component 104 fit together in cooperative assembly to form a seal gland 106 consisting of a static sealing surface 108, an environmental-side gland wall 110, a lubricant-side wall portion 112, and an non-circular support surface 114.

First seal housing component 102 incorporates a environment side clearance surface 116 for facing a relatively rotatable surface, and second seal housing component 104 incorporates a lubricant side clearance surface 118 for facing a relatively rotatable surface. Static sealing surface 108, environment side clearance surface 116 and lubricant side clearance surface 118 may be substantially planar, as shown. Environmental-side gland wall 110 and environment side clearance surface 116 intersect to form a circular intersection 120. Non-circular support surface 114 and lubricant side clearance surface 118 intersect in acute angular relation to form a non-circular intersection 122. The relatively rotatable surface (not shown) may also be of substantially planar form. Seal gland 106 can take any suitable form where in at least a portion of the lubricant-side gland wall forms a non-circular support surface 114 for supporting the non-circular flank 10 of a hydrodynamic rotary seal.

DETAILED DESCRIPTION OF THE EMBODIMENTS OF FIGS. 13–18

The cross-sectional drawings of FIGS. 13–15 show several specific ways to implement the non-circular flank 10 and the non-circular support surface 114. In each of FIGS. 13–15, the cross-section is taken at the seal location corresponding to the narrowest point of the dynamic sealing interface, and hidden line representation is used to depict the seal location corresponding to the widest point of the dynamic sealing interface.

In FIG. 13 the angle of non-circular flank 10 and non-circular support surface 114 varies about the circumference of the seal to create the non-circular flank 10.

In FIG. 14, which is the preferred embodiment of the present invention, the position of non-circular flank 10 and non-circular support surface 114 varies in a direction substantially parallel to relatively rotatable surface 126 to create the non-circular flank 10. This geometry, which is easy to machine, results in lubricant-side wall portion 112 also being non-circular, which provides additional anti-rotation interlocking.

In FIG. 15 the position of non-circular flank 10 and non-circular support surface 114 varies in a direction substantially perpendicular to relatively rotatable surface 126. FIG. 15 also shows that, if desired, second seal housing component 104 may telescope over first seal housing component 102 establishing a piloting interface 146 for alignment purposes.

FIG. 16 shows that non-circular support surface 114 can, if desired, form the entire lubricant-side gland wall, and also shows that non-circular flank 10 can extend from hydrodynamic inlet curvature 7 to static sealing surface 11 if desired. FIG. 16 also shows that the angulation of non-circular support surface 114 relative to lubricant side clearance surface 118 and/or static sealing surface 108 can approach perpendicular; even at such small angulation, a component 176 of the hydrostatic force (resulting from the pressure of environment 22 acting over the sealed area between static sealing surface 108 and relatively rotatable surface 126) serves to inhibit flattening of hydrodynamic inlet curvature 7 against relatively rotatable surface 126. FIG. 16 also shows that, if desired, first seal housing component 102 may telescope over second seal housing component 104. FIG. 16 also shows that a piloting interface 146 may be used between first seal housing component 102 and second seal housing component 104 to establish alignment thereof In FIG. 17, a first seal housing component 102 and a second seal housing component 104 fit together in cooperative assembly to form a seal gland 106. Non-circular support surface 114 and lubricant side clearance surface 118 intersect to form a non-circular intersection 122. Non-circular support surface 114 and non-circular flank 10 may be substantially perpendicular to lubricant side clearance surface 118, it being understood, however that such an arrangement is not as effective as the angulated embodiments. Non-circular support surface 114 inter-fits with, and supports non-circular flank 10 against environmental pressure, thereby helping to preserve the hydrodynamic wedging action, and thereby maintaining abrupt circular environment exclusion edge 12 in the intended substantially circular configuration for efficient environmental exclusion.

FIG. 18 shows that non-circular support surface 114 may be incorporated as part of an insert 164, rather than as part of second seal housing component 104 if desired. FIG. 18 also shows that insert 164 may have a journal bearing relationship with relatively rotatable surface 126 at journal bearing surface 166 if desired. When insert 164 is employed, seal gland 106 can, if desired, simply be cut into a single-piece housing (rather than being constructed from a first seal housing component 102 and a second seal housing component 104) provided that insert 164 is suitably split or molded in place, or provided that relatively rotatable surface 126 is substantially planar. Insert 164 may be made from any suitable material, such as metal, plastic or reinforced plastic, and may be of annular form. In FIGS. 16–18, the non-circular-support surface 10 and the hydrodynamic inlet curvature 7 together define substantially all of the lubricant side of the seal.

The hydrodynamic rotary seals of FIGS. 13–18 may be composed of any is suitable sealing material, including elastomeric or rubber-like materials and various polymeric materials, and including different materials bonded or assembled together to form a composite structure; however it is preferred that the portion of the seal adjacent to the hydrodynamic inlet curvature 7, dynamic sealing surface 8, and non-circular flank 10 be made from a reinforced material, such as multiple ply fabric reinforced elastomer having at least some of the plies substantially aligned with hydrodynamic inlet curvature 7, dynamic sealing surface 8, and non-circular flank 10, as discussed in detail in conjunction with FIG. 8. The geometry of non-circular flank 10 and non-circular support surface 114 can take any suitable design configuration for promoting hydrodynamic wedging without departing from the spirit or scope of the present invention.

Although the hydrodynamic rotary seals of FIGS. 2A–2E and 16–18 are shown be in radial compression against a relatively rotatable surface 126 of external cylindrical form, such as a shaft, sleeve, or washpipe for convenience in portraying footprint lubricant edge 28 and footprint environment edge 30, such is not intended to limit the spirit or scope of the invention. The invention as shown in FIGS.

2–18 is equally suitable for sealing against a relatively rotatable surface 126 forming a cylindrical bore which surrounds the hydrodynamic rotary seal, with the dynamic sealing surface 8, abrupt circular environment exclusion edge 12 and non-circular lubricant edge of dynamic sealing surface 8 being on the outside of the hydrodynamic rotary seal 2. The invention is also equally suitable for sealing in axial compression against a relatively rotatable surface 126 of planar form, with the dynamic sealing surface 8, abrupt circular environment exclusion edge 12 and non-circular lubricant edge of dynamic sealing surface 8 being on an end of the hydrodynamic rotary seal.

Even though several specific hydrodynamic rotary seal and seal gland geometries are discussed in detail herein, many other geometrical variations employing the basic principles and teachings of this invention are possible.

As will be readily apparent to those skilled in the art, the present invention may be produced in other specific forms without departing from its spirit or essential characteristics. The present embodiments are therefore to be considered as illustrative and not restrictive.

We claim:

1. A rotary seal gland assembly for sealing with a relatively rotatable surface and for excluding an environment, comprising:
    (a) a seal housing defining a lubricant side clearance surface and defining a lubricant chamber having a lubricant therein and having an environment side gland wall and a lubricant side gland wall disposed in spaced relation;
    (b) at least a portion of said lubricant side gland wall defining a non-circular support surface disposed in angular relation with said lubricant side clearance surface; and
    (c) an annular seal located between said environment side gland wall and said lubricant side gland wall and having a lubricant side and an environment side, said lubricant side having a hydrodynamic geometry corresponding with the configuration of said non-circular support surface.

2. The rotary seal gland assembly of claim 1, said seal housing comprising:
    (a) a first seal housing component defining said environment side gland wall and being exposed to the environment; and
    (b) a second seal housing component contacting said first seal housing component and defining said lubricant side gland wall and being exposed to lubricant within said lubricant chamber.

3. The rotary seal gland assembly of claim 2, comprising: said first and second housing components having clamping engagement with at least a portion of said annular seal.

4. The rotary seal gland assembly of claim 1, comprising: said annular seal having a non-circular flank at said lubricant side disposed for supported engagement with said non-circular support surface, having a dynamic sealing surface for sealing engagement with the relatively rotatable surface and having an abrupt circular environment exclusion edge at said environment side for contaminant excluding contact with the relatively rotatable surface.

5. The rotary seal gland assembly of claim 1, comprising: said annular seal being of multiple modulus construction having one section thereof composed of a resilient material having a predetermined modulus of elasticity and having at least a second section thereof composed of a resilient material having a modulus of elasticity different from the predetermined modulus of elasticity of said one section thereof.

6. The rotary seal gland assembly of claim 1, comprising: at least a portion of said environmental side gland wall being of circular configuration.

7. The rotary seal gland assembly of claim 6, comprising:
    (a) said annular seal defining an abrupt circular environment exclusion edge for facing the environment; and
    (b) said environment side gland wall supporting at least a portion of said environment side of said annular seal and maintaining circularity of said abrupt circular environment exclusion edge.

8. The rotary seal gland assembly of claim 1, comprising: said annular seal having a flexible dynamic sealing rim engaging said non-circular support surface and defining a dynamic sealing surface for sealing engagement with the relatively rotatable surface.

9. A rotary seal gland assembly for hydrodynamically lubricated sealing with a relatively rotatable surface, comprising:
    (a) a seal housing being subject to an environment and defining a lubricant chamber having a lubricant therein, said seal housing having an environment side gland wall and a lubricant side gland wall disposed in spaced relation and defining an annular seal gland therebetween;
    (b) at least a portion of said lubricant side gland wall defining a non-circular support surface; and
    (c) an annular seal located between said environment side gland wall and said lubricant side gland wall and defining a lubricant side and an environment side, at least a portion of said lubricant side of said annular seal having a non-circular flank corresponding to the configuration of said non-circular support surface, said annular seal defining a dynamic sealing surface for sealing with the relatively rotatable surface and defining an abrupt circular environment exclusion edge for exclusionary contact with the relatively rotatable surface.

10. The rotary seal gland assembly of claim 9, comprising:
    (a) said seal housing defining a lubricant side clearance surface; and
    (b) at least a portion of said non-circular support surface being disposed in acute angular relation with said lubricant side clearance surface.

11. The rotary seal gland assembly of claim 10, comprising: at least a portion of said annular seal being of composite construction of resilient sealing material and plies of reinforcing fabric.

12. The rotary seal gland assembly of claim 11, comprising:
    (a) said annular seal having a hydrodynamic inlet curvature; and
    (b) at least some of said plies of reinforcing fabric being disposed in substantially aligned relation with said non-circular flank, said hydrodynamic inlet curvature and said dynamic sealing surface.

13. The rotary seal gland assembly of claim 10, comprising: said annular seal having a flexible dynamic sealing rim engaging said non-circular support surface and defining said dynamic sealing surface for sealing engagement with the relatively rotatable surface.

14. The rotary seal gland assembly of claim 13, comprising:
    (a) said annular seal having at least one retention section; and
    (b) said seal housing having clamping engagement with said at least one retention section.

15. The rotary seal gland assembly of claim 13, comprising:
    at least a portion of said annular seal being of composite construction of resilient sealing material and plies of reinforcing fabric.

16. The rotary seal gland assembly of claim 15, comprising:
    (a) said annular seal having a hydrodynamic inlet curvature; and
    (b) at least some of said plies of reinforcing fabric being disposed in substantially aligned relation with said non-circular flank, said hydrodynamic inlet curvature and said dynamic sealing surface.

17. The rotary seal gland assembly of claim 10, comprising:
    (a) at least a portion of said environment side gland wall being of circular configuration;
    (b) said annular seal having a flexible dynamic sealing rim engaging said non-circular support surface and defining said dynamic sealing surface for sealing engagement with the relatively rotatable surface; and
    (c) at least a portion of said flexible dynamic sealing rim being in contact with said environment side gland wall for maintaining circularity of said abrupt circular environment exclusion edge.

18. The rotary seal gland assembly of claim 17, comprising:
    said environment side gland wall of said seal housing defining at least one pressure communication passage into said annular seal gland for communicating environment to said environment side of said annular seal.

19. The rotary seal gland assembly of claim 17, comprising:
    (a) said seal housing defining a static sealing surface having intersecting relation with said environment side gland wall;
    (b) said seal housing defining a lubricant side wall portion having obtuse angulated intersecting relation with said static sealing surface;
    (c) said non-circular support surface having intersecting relation with said lubricant side wall portion of said seal housing; and
    (d) at least a portion of said lubricant side of said annular seal having seated relation with said lubricant side wall portion.

20. The rotary seal gland assembly of claim 19, comprising:
    (a) at least a portion of said environment side gland wall being of circular configuration; and
    (b) said flexible dynamic sealing rim being in diagonal compression between said lubricant side wall portion and said environment side gland wall.

21. The rotary seal gland assembly of claim 17, comprising:
    (a) a static sealing surface being defined by said seal housing and disposed in intersecting relation with said environment side gland wall and said lubricant side gland wall; and
    (b) said annular seal being in diagonal compression between said static sealing surface, said lubricant side gland wall and said environment side gland wall.

22. The rotary seal gland assembly of claim 10, comprising:
    said acute angular relation between said non-circular support surface and said lubricant side clearance surface being variable.

23. The rotary seal gland assembly of claim 9, comprising:
    said annular seal being of composite construction of resilient sealing material and plies of reinforcing fabric.

24. The rotary seal gland assembly of claim 23, comprising:
    (a) said annular seal having a hydrodynamic inlet curvature; and
    (b) at least some of said plies of reinforcing fabric being disposed in substantially aligned relation with said non-circular flank, said hydrodynamic inlet curvature and said dynamic sealing surface.

25. The rotary seal gland assembly of claim 9, comprising:
    said annular seal being of multiple modulus construction having one section thereof composed of a resilient material having a predetermined modulus of elasticity and having at least a second section thereof composed of a resilient material having a modulus of elasticity different from the predetermined modulus of elasticity of said one section thereof.

26. The rotary seal gland assembly of claim 9, comprising:
    an annular insert defining said portion of said lubricant side gland wall defining said non-circular support surface.

27. The rotary seal gland assembly of claim 9, comprising:
    (a) said seal housing defining a lubricant side clearance surface; and
    (b) said non-circular support surface being oriented substantially perpendicular with respect to said lubricant side clearance surface.

28. The rotary seal gland assembly of claim 9, comprising:
    said seal housing defining a static sealing surface of generally cylindrical configuration, said static sealing surface disposed in intersecting relation with said lubricant side gland wall and said environment side gland wall.

29. The rotary seal gland assembly of claim 9, comprising:
    said seal housing defining a static sealing surface of generally conical configuration,
    said static sealing surface disposed in intersecting relation with said lubricant side gland wall and said environment side gland wall.

30. The rotary seal gland assembly of claim 9, comprising:
    said seal housing defining a static sealing surface of generally planar configuration, said static sealing surface disposed in intersecting relation with said lubricant side gland wall and said environment side gland wall.

31. The rotary seal gland assembly of claim 9, comprising:

(a) said annular seal defining an annular rim; and
(b) said seal housing having retaining relation with said annular rim to prevent rotation of said annular seal within said seal gland.

32. The rotary seal gland assembly of claim 9, comprising:
(a) a first seal housing component defining said environment side gland wall;
(b) a second seal housing component contacting with said first seal housing component and defining said lubricant side gland wall.

33. The rotary seal gland assembly of claim 32, comprising:
at least a portion of said annular seal being clamped between said first and second seal housing components.

* * * * *

UNITED STATES PATENT AND TRADEMARK OFFICE
CERTIFICATE OF CORRECTION

PATENT NO. : 6,334,619 B1
DATED : January 1, 2002
INVENTOR(S) : Lannie Dietle and Manmohan S. Kalsi It is certified that error appears in the above-identified patent and that said Letters Patent is hereby corrected as shown below:

Column 1,
Line 42, after "surface 8", delete "has a"

Column 2,
Line 32, change "flatting" to -- flattening --

Column 7,
Line 52, delete "15"

Column 9,
Line 3, before "flexible", insert -- cantilever-type --

Column 10,
Line 23, change "DECISION" to -- DESCRIPTION --
Line 38, correct "circumferentail" to read -- circumferential --
Line 50, correct "inhiibt" to read -- inhibit --

Column 12,
Line 26, change "potions" to -- portions --

Column 16,
Line 62, after "shown" add -- to --

Signed and Sealed this

Tenth Day of September, 2002

Attest:

JAMES E. ROGAN
Attesting Officer          Director of the United States Patent and Trademark Office